US011409363B2

(12) United States Patent
Chen et al.

(10) Patent No.: US 11,409,363 B2
(45) Date of Patent: Aug. 9, 2022

(54) AUGMENTED REALITY HAND GESTURE RECOGNITION SYSTEMS

(71) Applicant: Atheer, Inc., Santa Clara, CA (US)

(72) Inventors: Yu-Hsiang Chen, Santa Clara, CA (US); Neeraj Kulkarni, Santa Clara, CA (US)

(73) Assignee: West Texas Technology Partners, LLC, Waco, TX (US)

( * ) Notice: Subject to any disclaimer, the term of this patent is extended or adjusted under 35 U.S.C. 154(b) by 0 days.

(21) Appl. No.: 16/421,932

(22) Filed: May 24, 2019

(65) Prior Publication Data

US 2019/0369741 A1 Dec. 5, 2019

Related U.S. Application Data

(60) Provisional application No. 62/678,211, filed on May 30, 2018.

(51) Int. Cl.
| | |
|---|---|
| *G06F 3/01* | (2006.01) |
| *G06T 7/60* | (2017.01) |
| *G06T 7/73* | (2017.01) |
| *G06F 3/04845* | (2022.01) |
| *G02B 27/01* | (2006.01) |

(Continued)

(52) U.S. Cl.
CPC ........... *G06F 3/017* (2013.01); *G02B 27/017* (2013.01); *G06F 3/011* (2013.01); *G06F 3/012* (2013.01); *G06F 3/0482* (2013.01); *G06F 3/0485* (2013.01); *G06F 3/04845* (2013.01); *G06Q 10/0633* (2013.01); *G06Q 10/06316* (2013.01); *G06Q 10/063116* (2013.01); *G06T 7/60* (2013.01); *G06T 7/73* (2017.01); *G06V 40/107* (2022.01); *G06V 40/28* (2022.01); *G02B 2027/014* (2013.01); *G02B 2027/0138* (2013.01); *G06F 2203/04806* (2013.01); *G06T 2207/30196* (2013.01); *G06V 40/117* (2022.01)

(58) Field of Classification Search
CPC ................................ G06F 3/011; G06F 3/017
See application file for complete search history.

(56) References Cited

U.S. PATENT DOCUMENTS

| | | | | |
|---|---|---|---|---|
| 2007/0257891 A1* | 11/2007 | Esenther | ................. | G06F 3/044 345/173 |
| 2012/0069168 A1* | 3/2012 | Huang | ............... | H04N 21/4223 348/77 |

(Continued)

*Primary Examiner* — William Boddie
*Assistant Examiner* — Andrew B Schnirel
(74) *Attorney, Agent, or Firm* — Miller IP Law LLC

(57) ABSTRACT

A method, system, apparatus, and/or device for detecting pinch gestures in an augmented reality environment. The method, system, apparatus, and/or device may include: a wearable display, a sensor, and a processing device. The wearable display may be configured to attach to a head of a user and display an augmented reality environment to the user. The sensor may be configured to detect a position of a first digit of a hand of the user and detect a position of a second digit of the hand of the user. The processing device may be configured to: identify a first fingertip of the first digit; identify a second fingertip of the second digit; determine that the first fingertip and the second fingertip are in an open pinch position at a first point in time; and display a cursor at a midpoint between the first fingertip and the second fingertip.

20 Claims, 9 Drawing Sheets

(51) Int. Cl.
*G06Q 10/06* (2012.01)
*G06F 3/0482* (2013.01)
*G06F 3/0485* (2022.01)
*G06V 40/20* (2022.01)
*G06V 40/10* (2022.01)

(56) References Cited

U.S. PATENT DOCUMENTS

| | | | |
|---|---|---|---|
| 2013/0057469 A1* | 3/2013 | Ajika | G06F 3/017 |
| | | | 345/156 |
| 2014/0123077 A1* | 5/2014 | Kutliroff | G06F 3/017 |
| | | | 715/863 |
| 2015/0205362 A1* | 7/2015 | Park | G06F 3/0304 |
| | | | 345/156 |
| 2016/0117000 A1* | 4/2016 | Won | G06F 3/0482 |
| | | | 345/157 |
| 2016/0239080 A1* | 8/2016 | Margolina | G06T 19/20 |
| 2017/0307889 A1* | 10/2017 | Newman | G06F 3/03547 |
| 2018/0292908 A1* | 10/2018 | Kamoda | G06F 3/04842 |
| 2019/0212827 A1* | 7/2019 | Kin | G02B 27/0179 |

\* cited by examiner

AUGMENTED REALITY HAND GESTURE RECOGNITION SYSTEMS

CROSS-REFERENCE TO RELATED APPLICATION

This application claims the benefit of U.S. Provisional Application No. 62/678,211, filed on May 30, 2018, which are hereby incorporated by reference for all purposes.

BACKGROUND

An increasing number of workers in a variety of industries are assisted by hand-held or wearable computer systems. Rather than using computer kiosks or workstations at locations throughout the work environment, the hand-held or wearable computers allow the worker to move freely about the workspace and retrieve information from computer networks accessible at their fingertips, while they maintain in proximity to the object used for the task.

BRIEF DESCRIPTION OF THE DRAWINGS

The present description will be understood more fully from the detailed description given below and from the accompanying drawings of various embodiments of the present embodiment, which is not to be taken to limit the present embodiment to the specific embodiments but are for explanation and understanding.

DETAILED DESCRIPTION

Figure 1A:
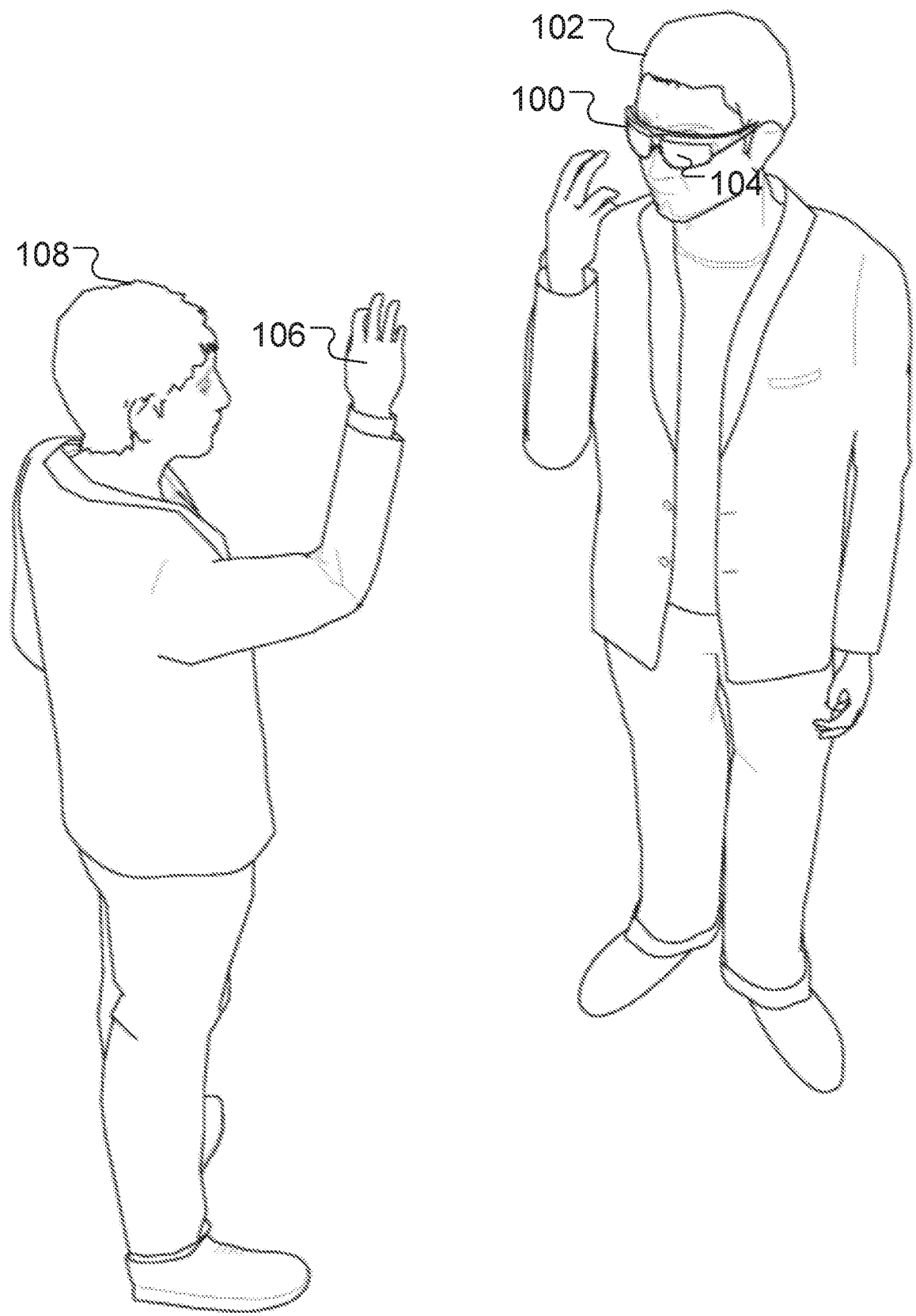
FIG. 1A illustrates a perspective view of a wearable device being worn by a user, according to an embodiment.

The disclosed augmented reality hand gesture recognition systems will become better understood through a review of the following detailed description in conjunction with the figures. The detailed description and figures provide merely examples of the various embodiments described herein. Those skilled in the art will understand that the disclosed examples may be varied, modified, and altered and not depart from the scope of the embodiments described herein. Many variations are contemplated for different applications and design considerations; however, for the sake of brevity, the contemplated variations may not be individually described in the following detailed description.

Throughout the following detailed description, examples of various augmented reality hand gesture recognition systems are provided. Related features in the examples may be identical, similar, or dissimilar in different examples. For the sake of brevity, related features will not be redundantly explained in multiple examples. Instead, the use of related feature names will cue the reader that the feature with a related feature name may be similar to the related feature in an example explained previously. Features specific to a given example will be described in that particular example. The reader is to understand that a given feature need not be the same or similar to the specific portrayal of a related feature in any given figure or example.

Individuals that work in industries where their hands must remain free to perform tasks may use wearable computer systems to retrieve and/or view the information needed to perform the tasks. For example, individuals working in manufacturing facilities may be required to maintain a clean and hygienic manufacturing area to prevent cross-contamination. Additionally, in the manufacturing environment and other environments, it may be required to record that all the steps and instructions in a defined manufacture procedure were performed. Wearable computer systems may aid in recording that all the steps and instructions were performed and investigate or document deviations taken during the manufacturing procedure. The records of the manufacturing and distribution of items with a complete manufacturing history may enable a manufacturer to retain the manufacturing information in a comprehensible and accessible format in case an investigation is needed to determine a product defect or failure. In another example, in retail operation environments where sales assistants or inventory control clerks may use wearable computer systems to identify products and/or retrieve product information associated with the product.

It may be difficult for individuals to interact with conventional wearable computer systems. For example, in the clean and hygienic manufacturing conditions, an individual may not be able to use their hands to interact with the wearable computer systems in order to maintain a clean and hygienic environment. Similarly, in a medical environment, medical personnel may not be able to use their hands to interact with the wearable computer systems in order to avoid introducing contagions into an operating environment. The conventional wearable computer systems may use touch-screens or mobile devices for the users to interact with the system.

Additionally, the conventional systems may use integrated displays or remote displays to display information to the individuals. However, the conventional integrated displays or remote displays may not be viewable to the user. For example, medical personnel may not be able to view the conventional integrated displays or remote displays as they perform medical procedures. Similarly, an individual in a clean and hygienic environment performing a manufacturing process may not be able to view the conventional integrated displays or remote displays as they perform manufacturing procedures.

Implementations of the disclosure address the above-mentioned deficiencies and other deficiencies by providing methods, systems, devices, or apparatus to display an augmented reality environment to users and provide interactive user interfaces. In one embodiment, the augmented reality systems may be head-mounted systems. The augmented reality systems may include sensors and/or detector units to detect, gather, and/or transmit data to a processing device. The processing device may be an integrated or onboard processing device or an external or remote processing device. The augmented reality systems may include an augmented reality display to overlay or display information to a user.

In one embodiment, the augmented reality systems may provide a user access to remote help, capture images, take sensor measurements, send data to send to a remote individual, and so forth. For example, an augmented reality system may transmit a still image or a video from a perspective of the user, also referred to as a "see what I see" perspective. In another example, the augmented reality systems may overlay images or information into an augmented reality environment display for a viewer to see a projected perspective of the images or information. An advantage of the augmented reality system may be to provide a user interface for a user to interact within a variety of environments, including hands-free environments, clean and hygienic environments, collaborative environments, remote environments, and so forth.

FIG. 1A illustrates a perspective view of a wearable device 100 being worn by a user 102, according to an embodiment. The wearable device 100 is designed to display an image near an eye or eyes of a user 102 and execute computer-executable instructions in response user gestures by incorporating motion and image capture features. The wearable device 100 may include lens 104 substantially near the eye(s) of the user 102. The lens 104 may include a transparent or partially transparent screen that is at least partially disposed within a field of view of the user 102. The screen may display an augmented reality where a user may be able to view augmented reality objects. The screen may have a transparency level to enable the user 102 to see gestures 106 and real-world objects 108.

Figure 1B:
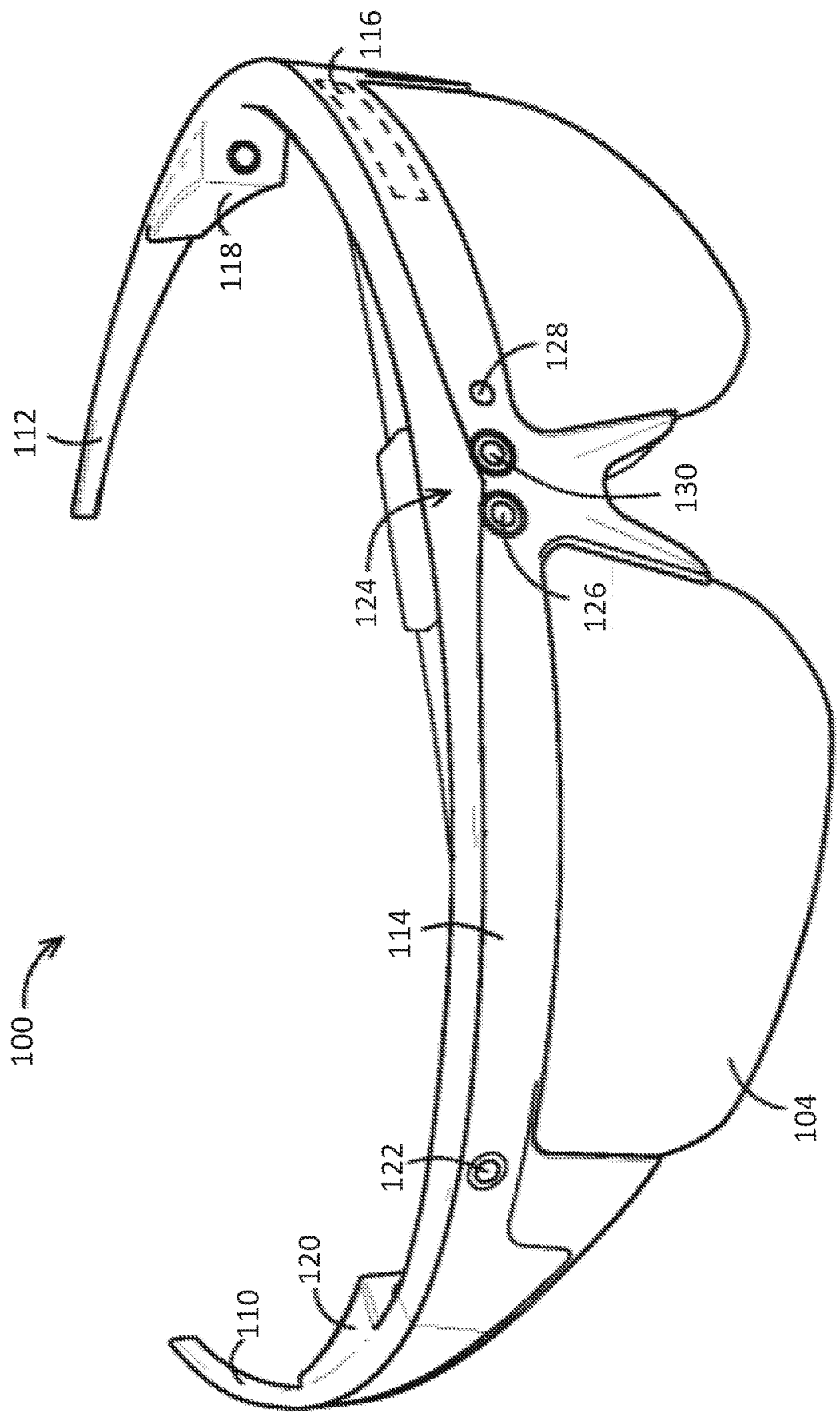
FIG. 1B illustrates a perspective view of the wearable device in FIG. 1A, according to an embodiment.

FIG. 1B illustrates a perspective view of the wearable device 100 in FIG. 1A, according to an embodiment. Some of the features in FIG. 1B are the same or similar to some of the features in FIG. 1A as noted by same reference numbers, unless expressly described otherwise.

The wearable device 100 may include a first temple 110, a second temple 112, and a bar 114 extending between the two temples 110 and 112. The first temple 110 and second temple 112 extend from the wearable device 100 to rest on the ears of the user 102 in FIG. 1A to provide support for the wearable device 100.

The wearable device 100 may include a processing device 116, the lens 104, a first image generator 118, a second image generator 120, a motion capture device 124, and a microphone 122. The wearable device 100 may be configured to capture user gestures, along with other objects within a captured scene, and execute computer processes or commands in response to the captured objects. This may involve manipulating a display produced by a first image generator 118 and/or a second image generator 120 on lens 104. For example, the first image generator 118 may display a first virtual object or portion of a virtual object on a first portion of the lens 104. In another example, the second image generator 120 may display a second virtual object or portion of a virtual object on a second portion of the lens 104. In another example, the lens 104 may be a single continuous lens extending across the bar 114. In another example, the lens 104 may include multiple lens or portions of lens extending across the bar 114. The first virtual object and/or the second virtual object includes text, a graphical object, a video, a live data steam, and so forth.

The wearable device 100 may additionally execute computer processes in response to audio captured by the microphone 122. By incorporating these capturing technologies, the wearable device 100 may display and control computer images and processes. The processing device 116 may be supported by the bar 114. The processing device 116 may be configured to execute computer-executable instructions and control the electronic elements of the wearable device 100.

The processing device 116 may acquire data from other elements of the wearable device 100 or from external sources and execute computer executable code in response to this data. For example, the processing device 116 may be configured to acquire data from the motion capture device 124 such as data that corresponds to a user gesture. The processing device 116 may additionally or alternatively acquire data from the microphone 122. In some examples, the processing device 116 may acquire data from a separate device, such as a portable music player, a personal data assistant (PDA), a smartphone, a global positioning system (GPS), or the like.

The processing device 116 may be in coupled to the first image generator 118 and/or the second image generator 120 and may instruct the first image generator 118 and/or the second image generator 120 to generate and manipulate a display projected on lens 104. In one example, the processing device 116 may generate a user interface on the lens 104. The processing device 116 may acquire data from other elements or sensors of the wearable device 100 and manipulate the user interface in response to this data.

The first image generator 118 and/or the second image generator 120 may be attached to the first temple 110 and may be substantially aligned with the lens 104. The wearable device 100 may include additional image generators to augment the expanse of generated images over the lens 104 surface area. The first image generator 118 and/or the second image generator 120 may be configured to display images on the lens 104 facing an eye or eyes of the user 102 in FIG. 1A in response to instructions executed by the processing device 116. These images often may overlay and/or augment a naturally viewed scene within a field of vision of the user 102. The first image generator 118 and/or the second image generator 120 may display opaque and/or partially transparent images on the lens 104.

The motion capture device 124 may be connected to the bar 114. In one embodiment, the motion capture device 124 may be oriented away from the user 102 when the user 102 is wearing the wearable device 100 to capture images and motion occurring beyond the lens 104. In another embodiment, the motion capture device 124 may include an image sensor 126 with a camera, a light source 128, and a depth sensor 130. The motion capture device 124 may capture images that include at least a portion of the environment surrounding the wearable device 100 (such as a head-mounted device or a head-mounted display).

The image sensor 126 may be connected to the bar 114. In one embodiment, the image sensor 126 may be oriented away from the user 102 as the user 102 wears the wearable device 100. The image sensor 126 may be configured to capture an image from a scene and communicate data corresponding to the captured image to the processing device 116. The image sensor 126 may capture light within the visual spectrum and/or light outside the visual spectrum. For example, the image sensor 126 may capture infrared or ultraviolet light.

The light source 128 may be connected to the bar 114. The light source 128 may be substantially aligned with the image sensor 126. The light source 128 may be configured to project light in a defined direction. This light is reflected from an object and may be captured by the motion capture device 124. The reflected light may allow the motion capture device 124 to more accurately capture images and motion of objects or the surrounding environment. The light source 128 may project visual light and/or light outside the visual spectrum.

The depth sensor 130 may be connected to the bar 114. The depth sensor 130 may be configured to capture images and motion from a scene at a different angle than image sensor 126. The data captured from this second viewpoint may allow the processing device 116 to compare the data received from the depth sensor 130 to the data received from the image sensor 126 to better detect a depth of objects in the environment surrounding the wearable device 100.

Figure 2:
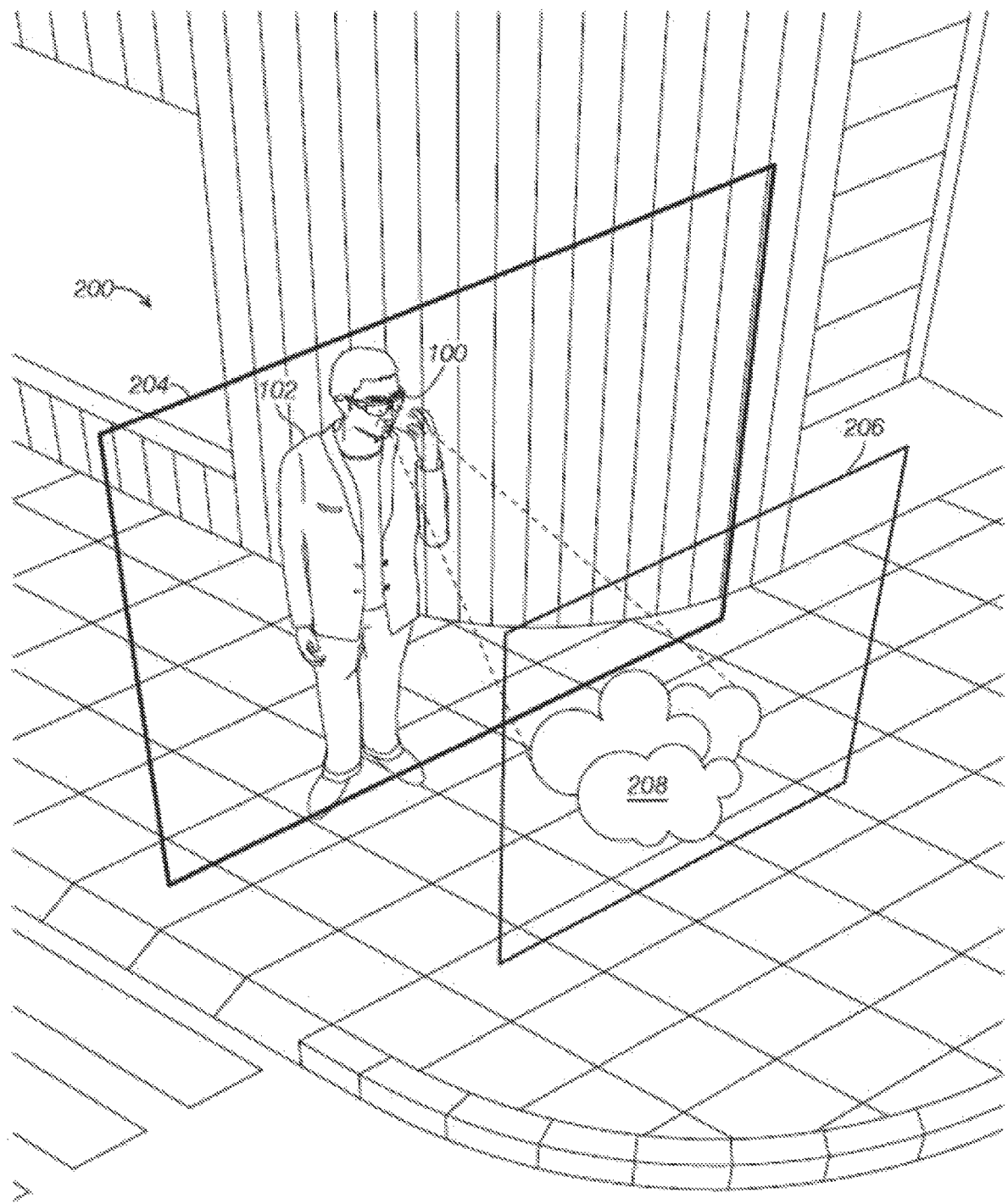
FIG. 2 illustrates an augmented reality system with a user wearing the wearable device 100, according to an embodiment.

FIG. 2 illustrates an augmented reality system 200 with a user 102 wearing the wearable device 100, according to an embodiment. Some of the features in FIG. 2 are the same or similar to some of the features in FIGS. 1A and 1B as noted by same reference numbers, unless expressly described otherwise. The user may be located along a first plane 204. The wearable device 100 may include a lens 104 to display a virtual object to an eye or eyes of the user 102. For example, the wearable device 100 may include a first portion of the lens 104 that may display a first image or virtual object to a first eye of the user 102 and a second portion of the lens 104 that may display a second image or virtual object to a second eye of the user 102. When combined or aggregated, the first image or virtual object and the second image or virtual object may form an augmented reality environment to project one or more virtual or augmented reality objects to the user 102 at defined locations within a physical environment surrounding the user 102.

The wearable device 100 may display multiple images to project one or more virtual or augmented reality objects 208 within a physical environment surrounding the user 102. In one embodiment, the user and the wearable device 100 may be located along the first plane 204 and the augmented reality object 208 may be displayed to appear at a defined distance from the user 102 at a second plane 206. In one embodiment, the wearable device 100 may include a position sensor, such as a GPS device or a position transceiver. For example, the wearable device 100 may be a pair of glasses, smart glasses, a face shield, and so forth that may be worn by the user 102 and include multiple sensors, including the position sensor. In another embodiment, the position sensor may separate from the wearable device 100 and be attached to the body of the user 102.

In one example, the position sensor may be positioned proximate to a line of sight of the user 102. In another embodiment, an alignment sensor may measure a difference between a position of the user 102 indicated by the position sensor and the actual location of the user's eyes and generates a view aligned to the user's line of sight. In one embodiment, the lens 104 in FIGS. 1A and 1B may project a virtual or augmented reality environment or a virtual or augmented reality object 208 at a set focal distance from the user 102. In one example, the focal distance may be along the second plane 206. The virtual or augmented reality environment or the virtual or augmented reality object 208 may be a user interface that enhances or supplements the user's interactions in the physical environment and/or physical objects approximate or surrounding the user.

Figure 3:
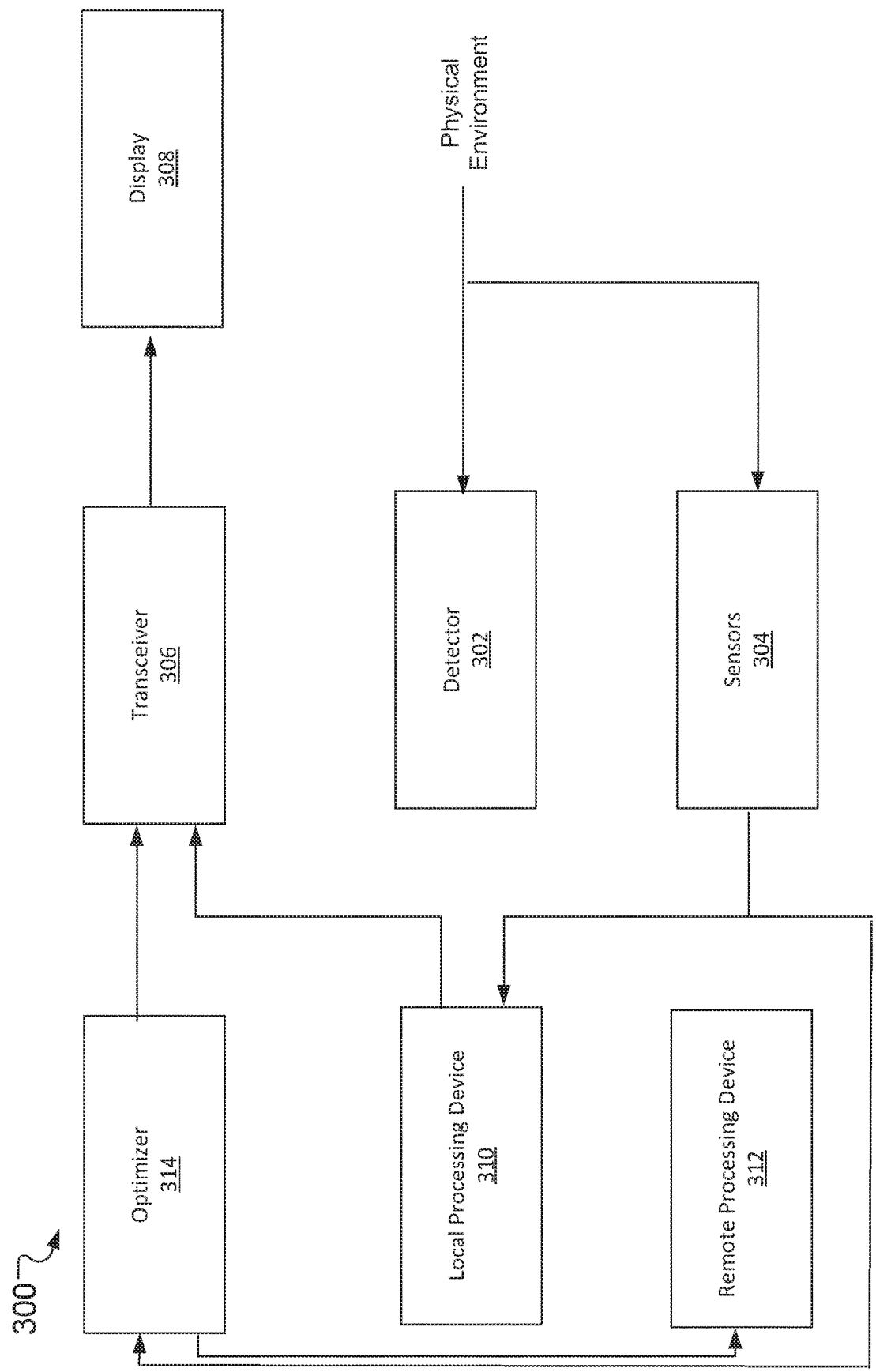
FIG. 3 illustrates a system of the wearable device in FIGS. 1A-2, according to an embodiment.

FIG. 3 illustrates a system 300 of the wearable device 100 in FIGS. 1A-2, according to an embodiment. The system 300 may include a detector 302, sensors 304, a transceiver 306, an augmented reality display 308, a local processing device 310, a remote processing device 312, and an optimizer 314. In one embodiment, the detector 302 and/or the sensors 304 may take measurements and collect data from a physical environment approximate to the wearable device 100. In another embodiment, the local processing device 310 may be a local processing device attached to or integrated into the wearable device 100.

The local processing device 310 may be positioned proximate to the user that interacts with a remote processing device 312. In another embodiment, the remote processing device 312 may be a remote processing device that may be external to the wearable device 100. The transceiver 306 may receive instructions from the local processing device 310 to project the augmented display 20. The transceiver 306 may measure characteristics from the physical environment and communicate the data to the local processing device 310 and an optimizer 314.

The optimizer 314 may be in communication with the remote processing device 312, the local processing device 310, and the transceiver 306. The transceiver 306 may measure or detect user characteristics or gestures including head position, movement, speed, etc. In one example, using gestures, the user may open applications to be displayed in the augmented environment. These applications may include task flows, attached documents, and so forth. The gestures may allow the user to access the applications and execute instructions such as select instructions, open instructions, scrolling instructions, movement instructions, and so forth. Alternatively, the gestures may be used to operate on the icon representing the application by changing the size (zooming in and out), color, sound, and so forth. The gestures may include the user performing scrolling gestures, tapping gestures, or clicking gestures with respect to a virtual object. The scrolling gestures may include body motions, head motions, hand motions, and so forth.

Figure 4A:
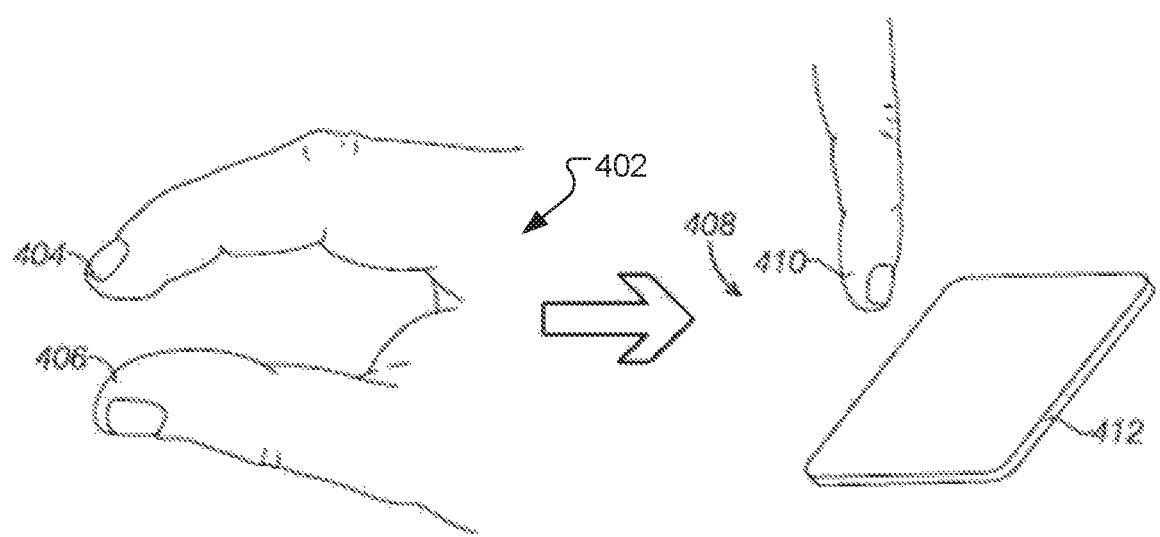
FIG. 4A illustrates an open pinch gesture by a first digit and a second digit detected using a touch-free sensor of a wearable device, according to an embodiment.
Figure 4B:
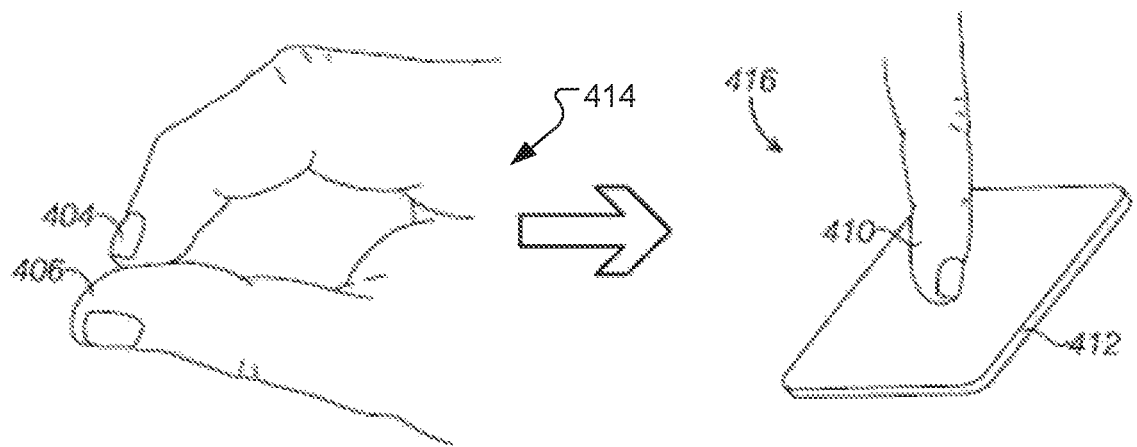
FIG. 4B illustrates a closed pinch gesture by the first digit and the second digit detected by the touch-free sensor of a wearable device, according to an embodiment.

FIG. 4A illustrates an open pinch gesture 402 by a first digit 404 and a second digit 406 detected using a touch-free sensor of a wearable device, according to an embodiment. In one embodiment, the open pinch gesture 402 may be associated with a first input 410 by a third digit 412 that is detected by a touch sensor 412. FIG. 4B illustrates a closed pinch gesture 414 by the first digit 404 and the second digit 406 detected by the touch-free sensor of the wearable device, according to an embodiment. In another embodiment, the closed pinch gesture 414 may be associated with a second input 416 by a third digit 410 that is detected by the touch sensor 412. The first digit 404, the second digit 406, and/or the third digit 410 may be fingers of one or more hands, styluses, and so forth. In one example, the first digit 404 may be a first finger of a hand and the second digit 406 may be a second finger of the hand. In another example, the third digit 410 may be the first digit 404, the second digit 406, or another digit of the hand.

In one embodiment, when the processing device detects the open pinch gesture 402 followed by the open pinch gesture 402 changing to the closed pinch gesture 414, a processing device of the wearable device may execute a tap instruction (such as a single tap or a double tap) associated with the user tapping on the touch sensor 412. For example, the open pinch gesture 402 may be associated with a hovering gesture of the third digit 410 hovering over the touch sensor 412, as shown in FIG. 4A. The open pinch gesture 402 changing to the closed pinch gesture 414, as shown in FIG. 4B, may be associated with the third digit 410 moving from the hovering position to tapping on the touch sensor 412.

In another embodiment, when the processing device detects (using a sensor) the closed pinch gesture 414 followed by the closed pinch gesture 414 changing to the open pinch gesture 402, the processing device may execute a swipe instruction associated with the user swiping on the touch sensor 412. In another embodiment, when the processing device detects that the closed pinch gesture 414 is performed for a threshold period of time (where the fingers remain pinched), the processing device may execute a press and hold instruction. In one example, the threshold period of time for the fingers to remain pinched after detecting closed pinch gesture 414 may be 800 milliseconds. In one example, the threshold period of time for the fingers to remain pinched after detecting closed pinch gesture 414 may be at least 0.5 seconds.

In one embodiment, the wearable device may include a camera configured to capture the open pinch gesture 402 and/or the closed pinch gesture 414. For example, the camera may be configured to detect the positions of the first digit 404 and/or the second digit 406 by generating a hand skeletal structure information and applying one or more geometric filters on top of hand skeletal structure information. For example, the processing device may execute a hand skeleton detection algorithm (HSDA) that identifies hand skeleton key point locations in an image(s) or video captured by the camera and determines geometric information of the image(s) or frame(s) of the video using a depth sensor or depth measurements.

The hand skeleton key point may include fingertips, finger bases, a palm center, wrist points, an arm-point, and so forth. When the processing device identifies the hand skeleton structure information, the processing device may use the hand skeleton key points to identify the positions of the first digit 404, the second digit 406, and/or the third digit 410 to determine the open pinch gesture 402 and/or the closed pinch gesture 414. For example, the processing device may analyze an image or a frame to determine the positions of the first digit 404 and the second digit 406 relative to the palm center and/or the wrist point.

In another embodiment, the processing device may detect multiple hands performing the open pinch gesture 402 and/or the closed pinch gesture 414. The processing device may determine the number of hands within a threshold range of a sensor (such as a camera) and monitor the gestures made by each hand within the threshold range. For example, when the processing device detects two hands within the threshold range, the processing device may monitor both hands for gestures and when either or both hands perform gestures associated with an instruction, the processing device may execute the associated instruction. In one embodiment, the threshold range may be between 12 inches from the sensor and 48 inches from the sensor. In another embodiment, the threshold range may be 24 inches from the sensor to 84 inches from the sensor. In another embodiment, the processing device may define a center point at a defined distance from the sensor and the threshold range may be a threshold distance from the center point. For example, the center point may be 36 inches from the sensor and the threshold distance may be 0 inches to 36 inches from the center point.

In another embodiment, when the processing device detects 2 hands within a threshold distance from a two-handed rotation axis point (THRA point) where both hands are the same or similar distances from the THRA point, the processing device may execute a rotate instruction for a virtual object. In one embodiment, the processing device may determine whether the two hands are within the threshold distance or a distance of the hand (DoH) of the THRA point using a depth sensor. For example, when a hand of the user is moving along an X axis, a Y axis, or a Z axis, the depth sensor may detect a range of the hand along the X axis, the Y axis, or the Z axis relative to the THRA point. In one example, the range may be from 10 centimeters (cm) to 100 cm. In one example, when there are N objects within a first threshold range along the X axis and Y axis but at different ranges along the Z axis, the processing device may divide or map the N objects into different quadrants based on where the object lies along the Z axis. The processing device may determine where the two hands are along the Z axis to determine the quadrant the two hands are within and then rotate the object within that quadrant.

In one embodiment, the similar distance of both hands from the THRA point may be that both hands are within 6 inches of the same distance from the center point. In another embodiment, the similar distance of both hands from the THRA point may be when both hands are equidistant from a defined point or location in space, such as a midpoint along a line. The processing device may define the THRA point as the axis around which a rotation may be performed. The THRA point may be a midpoint of the two pinch locations.

In one example, when the processing device detects open pinch gestures 402 and/or closed pinch gestures 414 by the digits of both hands moving in same cyclic directions (e.g. clockwise or counterclockwise) around the THRA point, the processing device may execute the rotate instruction to rotate the virtual object. In another embodiment, when both hands remain within the same or similar distance from the THRA point and are each performing the open pinch gestures 402 and/or closed pinch gestures 414, the processing device may define the THRA point as being stable at the defined location and may execute the rotate instruction. When the processing device determines that the THRA point is not stable, the processing device may not execute the rotate instruction.

In another embodiment, when the processing device detects the two hands performing the closed pinch gesture 414 and moving in contracting or expanding directions relative to the THRA point, the processing device may execute a zoom in or zoom out instruction, respectively. In another embodiment, when the processing device detects the closed pinch gesture 414 in conjunction with rotating the hands about one of an X axis, a Y axis, or a Z axis, the processing device may execute a rotating instruction for a virtual object in an augmented reality environment. In another embodiment, when the processing device detects the closed pinch gesture 414 in conjunction with a hand moving along a Z axis, the processing device may execute a zoom in instruction or a zoom out instruction based on the direction the hand moves along the Z axis. In one example, the Z-axis may be perpendicular to a display of the wearable device. In another embodiment, a hand distance between two hands of a user with respect to the display of the wearable device may be used to identify which object within an augmented reality environment the user desires to interact when there are multiple objects in close X/Y position but different Z position.

In one embodiment, to identify different pinch gestures for different individuals, as different individuals may pinch differently, the processing device may use a midpoint a fingertip of the first digit 404 and a fingertip of the second digit 406 when identifying the open pinch gesture 402 and the closed pinch gesture 414. The processing device may measure the movement of the fingertips relative to the midpoint to determine if the first digit 404 and the second digit 406 are performing the open pinch gesture 402, the closed pinch gesture 414, or another gesture. For example, an individual may move a fingertip, such as a thumb fingertip, while making a pinching gesture and such movement may cause the gesture movement to be unstable. In this example, the processing device may use the midpoint between the fingertips to avoid instability in measuring the open pinch gesture 402 or the closed pinch gesture 414. In another example, when a user turns their hand to an angle that two fingers are facing forwards (away from the user), a sensor (such as a camera or a depth sensor) may not be able to detect a position where the fingertips touch each other to perform the open pinch gesture 402 and/or the closed pinch gesture 414. In one embodiment, to detect the open pinch gesture 402 and/or the closed pinch gesture 414 when the fingers of the user are facing forward before the two fingers touch each other, the processing device may determine a pinch intent of the user. To determine the pinch intent, the depth sensor may identify another digit of the individual (such as an index finger) and compare a position of the other digit to a database indicating positions of the other digit. The processing device may then estimate whether the other digit indicates that the user is performing the open pinch gesture 402 and/or the closed pinch gesture 414 based on the position of the other digit.

In another example, when the first digit 404 and the second digit 406 fingers are facing away from a face of the user, an image from the camera of the wearable device may display the first digit 404 and the second digit 406 as viewable as pointing a vertical line or a '1' symbol. In the image(s) and/or frame(s) where the side profile of the first digit 404, the second digit 406, and/or the other digits of a hand may not be viewable based on the HSDA, the processing device may estimate the position of the first digit 404, the second digit 406, and/or the other digits of a hand. For example, when an individual performs a pinch, the images or frames may illustrate a sequence of the first digit 404 with at least a portion of the fingertip gradually moving downward relative to the other digits of the hand until the first digit 404 stops moving downward.

In one embodiment, the first digit 404 may stop moving downward when the first digit 404 is a defined distance from the second digit 406. The processing device may establish a midpoint between the first digit 404 and the second digit 406 based on a relative distance between the second digit 406 and one or more of the other digits of the hand. In one embodiment, the first digit 404 may stop moving downward when the first digit 404 is in contact with the second digit 406. The processing device may determine the contact between the first digit 404 and the second digit 406 based on a relative distance between the second digit 406 and one or more of the other digits of the hand. The contact between the first digit 404 and the second digit 406 may correspond with a tapping instruction as discussed above.

In another embodiment, the processing device may determine the open pinch gesture 402 changing to the closed pinch gesture 414 (also referred to as a pinch intent) by comparing positions of the first digit 404 and the second digit 406 to a training dataset of the average positions of the first digit 404 and the second digit 406 given a palm size of the user. For example, based on training dataset, the processing device may determine an average distance range between the first digit 404 and the second digit 406 when the first digit 404 and the second digit 406 are in the open pinch position 402 corresponding to a hovering position above the touch sensor 412. The processing device may also define a buffer value to reduce or eliminate false positives. When the distance between the first digit 404 and the second digit 406 becomes less than the average distance range minus the buffer, the processing device may determine that a pinch intent has occurred.

Figure 4C:
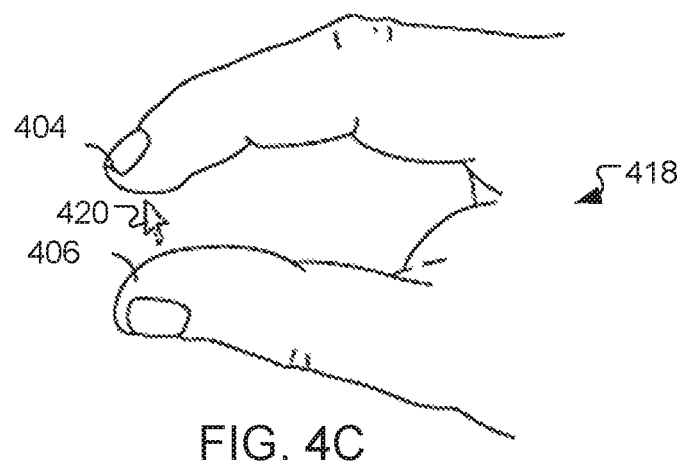
FIG. 4C illustrates a cursor location gesture by the first digit and the second digit detected using a touch-free sensor of a wearable device, according to an embodiment.

FIG. 4C illustrates a cursor location gesture 418 by the first digit 404 and the second digit 406 detected using a touch-free sensor of a wearable device, according to an embodiment. Some of the features in FIG. 4C are the same or similar to some of the features in FIGS. 4A and 4B as noted by same reference numbers, unless expressly described otherwise.

As discussed above, the processing device may use the HSDA to detect key points of an individual's hand(s). In one embodiment, the processing device may use the key points to determine a location to display a cursor 420 in an augmented reality environment. In one example, the processing device may determine a location of the cursor 420 relative to the fingertip of the first digit 404, the fingertip of the second digit 406, and a palm-center (defined as a midpoint) to remove variability or instability in fingertip motions.

In one embodiment, the processing device may determine a midpoint between a fingertip of the first digit 404 and a fingertip of the second digit 406 when the fingertip of the first digit 404 and the fingertip of the second digit 406 are in an open position. For example, when the fingertip of the first digit 404 and the fingertip of the second digit 406 form an open pinch gesture 402 where the first digit 404 and the second digit 406 form an open C shape, the processing device may determine a midpoint between the fingertip of the first digit 404 and the fingertip of the second digit 406 to execute a cursor location instruction. The cursor location instruction may position a cursor 420 in an augmented reality environment at the midpoint between the fingertip of the first digit 404 and the fingertip of the second digit 406. In one embodiment, the cursor location instruction may be executed to define the location of the cursor 420 so that when a tapping instruction is performed by the user as discussed in FIGS. 4A and 4B, the processing device may define what virtual object the user is tapping on in the augmented reality environment. In another embodiment, the midpoint may be defined at a beginning of the transition from the open pinch gesture 402 in FIG. 4A to the closed pinch gesture 414 in FIG. 4B such that the cursor 420 remains steady relative to a wrist point of a hand throughout the transition.

In another embodiment, to identify different pinch gestures for different individuals, when the fingers of the user are within a defined distance of the wearable device to identify pinch intention, the cursor 420 in the augmented reality environment may be positioned between the two fingers of the user performing the open pinch gesture 402 and/or the closed pinch gesture 414. For example, when the individual starts the open pinch gesture 402 or the closed pinch gesture 408, the cursor 420 may stay between the fingers as the first digit 404 and/or the second digit 406 move towards each other and when the first digit 404 is touching the second digit 406, the processing device may render a steady cursor 420 that the user can aim and select objects with.

As the fingers start pinching in, the cursor 420 may remain visibly stable regardless of how the two fingers are moving, as long as the wrist or hand is still or relatively still. For example, the user may see a stable cursor 420 that does not shift during the pinch gesture process and they can aim and select objects within the augmented reality environment using the cursor 420. In one example, if the wrist or the hand of the user moves during the pinch gesture process, the processing device may move the cursor 420 according to the movement and/or rotation of the wrist or the hand. The midpoint may then be correlated to a cursor 420 such that as the midpoint moves in the physical environment the cursor 420 may move in the augmented reality environment.

Figure 5A:
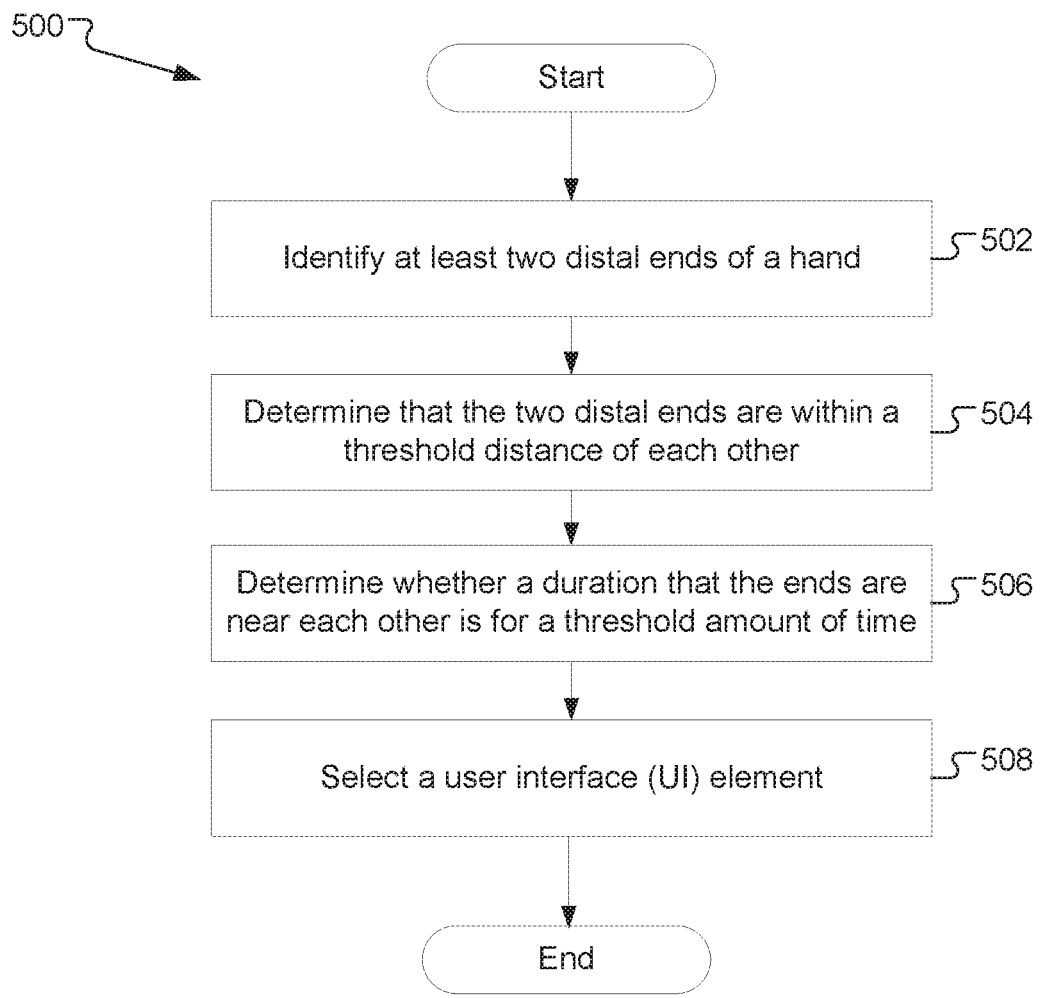
FIG. 5A illustrates a flowchart of a method for detecting a pinch and select gesture, according to an embodiment.

FIG. 5A illustrates a flowchart 500 of a method for detecting a pinch and select gesture, according to an embodiment. In one example, a user may form a C shape with a first digit and a second digit of their right hand or their left hand and hovers over a user interface (UI) element the user intends to select. When the user pinches the fingertips of the first digit and the second digit together to transition from the C shape to an O shape of the first digit and the second digit, a processing device may execute a UI element selection instruction.

The method may include identifying at least two distal ends of a hand for a single-handed gesture (block 502). In one example, the two distal ends may be the fingertips of the first digit and the second digit. The first digit or the second digit may be a finger or thumb of the user. As discussed above, the distal ends or fingertips may be identified based on skeletal key points in a hand skeleton in different images or different frames of a video. The processing device may identify hand skeleton keypoint locations using the images or frames and determine a geometry of the distal ends using a depth sensor and or the HSDA.

The method may include determining that the two distal ends are within a threshold distance of each other (block 504). In one embodiment, the threshold distance may be based on a Euclidean distance between the two distal ends in a three dimensional (3D) space. In one embodiment, the threshold distance may be a distance of 1 centimeter (cm). In one example, when the two distal ends are within 1 cm of each other, the two distal points may be within the threshold distance. The threshold distance of 1 cm is not intended to be limiting and the threshold distance may be other distances, such as 0.5 cm or 2 cm.

The method may include determining whether a duration that the two ends are within the threshold distance for a threshold amount of time (block 506). In one example, the threshold amount of time may be 500 milliseconds. In another example, the threshold amount of time may be 0.5 seconds. The threshold amount of time is not intended to be limiting and the threshold amount of time may be other amounts of time, such as 1 second or 250 milliseconds.

In another example, the threshold amount of time may vary for different instructions associated with the two distal ends being within the threshold distance of each other. For example, the threshold may be less than or equal to 500 milliseconds where when the user holds the two distal ends together for less than or equal to 500 milliseconds the processing device may execute a select instruction to select an object or element in the augmented reality environment. In another example, the threshold may be greater than 500 milliseconds where when the user holds the two distal ends together for an amount of time greater than 500 milliseconds the processing device may execute a hold-and-drag instruction to select the object or element and move the object or element from a first location to a second location in the augmented reality environment.

The method may include selecting a user interface (UI) element (block 508). In one embodiment, the processing device may perform the method in flowchart 500 for both hands of a user where one distal end of each hand or a midpoint between both hands is used to execute an instruction. In a dual hand embodiment, a distal end of each hand is identified and the two-handed instruction may be performed when both distal ends perform a gesture. A single hand instruction using two distal ends of one hand may include a finger tap instruction, scroll instruction, a long press instruction, a repositioning instruction, a selection instruction, and so forth. The selection instruction or finger tap instruction may be an instruction where the user pinches and selects an item in the augmented reality environment or physical environment and an application, data, and so forth associated with the item is displayed in the augmented environment.

The repositioning instruction may include the processing device using a camera identifying a first location where the two distal ends came within the threshold distance (also referred to as a pinch gesture) and determine the two distal ends then move to a second location before moving outside the threshold distance from each other. The UI element may be repositioned in the augmented reality environment from the first location to the second location. A two hand instruction using two distal ends of two hand may include zoom instruction, rotate instruction, and so forth.

In one example, to the select the UI element, one of the distal ends may hover over a UI element to be selected, the other distal end may tap the selecting distal end, and when the duration that the distal ends are within a threshold distance of each other exceeds a threshold amount of time the UI element may be selected.

Figure 5B:
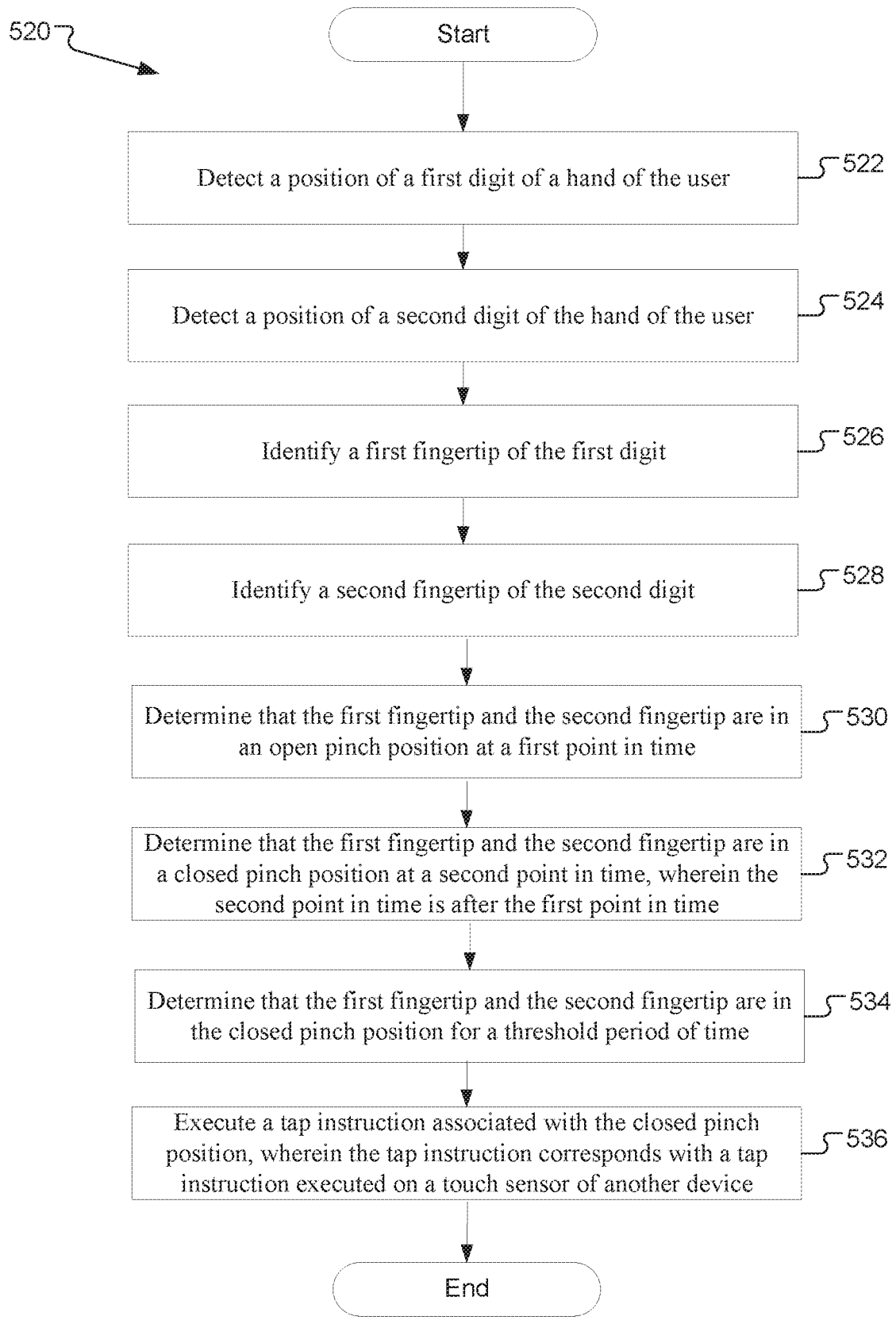
FIG. 5B illustrates a flowchart for a method of identifying a single-handed gesture, according to an embodiment.

FIG. 5B illustrates a flowchart 520 for a method of identifying a single-handed gesture, according to an embodiment. The method may include detecting, by a sensor, a position of a first digit of a hand of the user (block 522). The method may include detecting, by the sensor, a position of a second digit of the hand of the user (block 524). The method may include identifying, by a processing device, a first fingertip of the first digit (block 526). The method may include identifying a second fingertip of the second digit (block 528). The method may include determining that the first fingertip and the second fingertip are in an open pinch position at a first point in time (block 530). The method may include determining that the first fingertip and the second fingertip are in a closed pinch position at a second point in time, wherein the second point in time is after the first point in time (block 532). The method may include determining that the first fingertip and the second fingertip are in the closed pinch position for a threshold period of time (block 534). The method may include in response to that the first fingertip and the second fingertip are in the closed pinch position for a threshold period of time, executing a tap instruction associated with the closed pinch position (block 536). In one example, the tap instruction may correspond with a tap instruction executed on a touch sensor of another device.

Figure 5C:
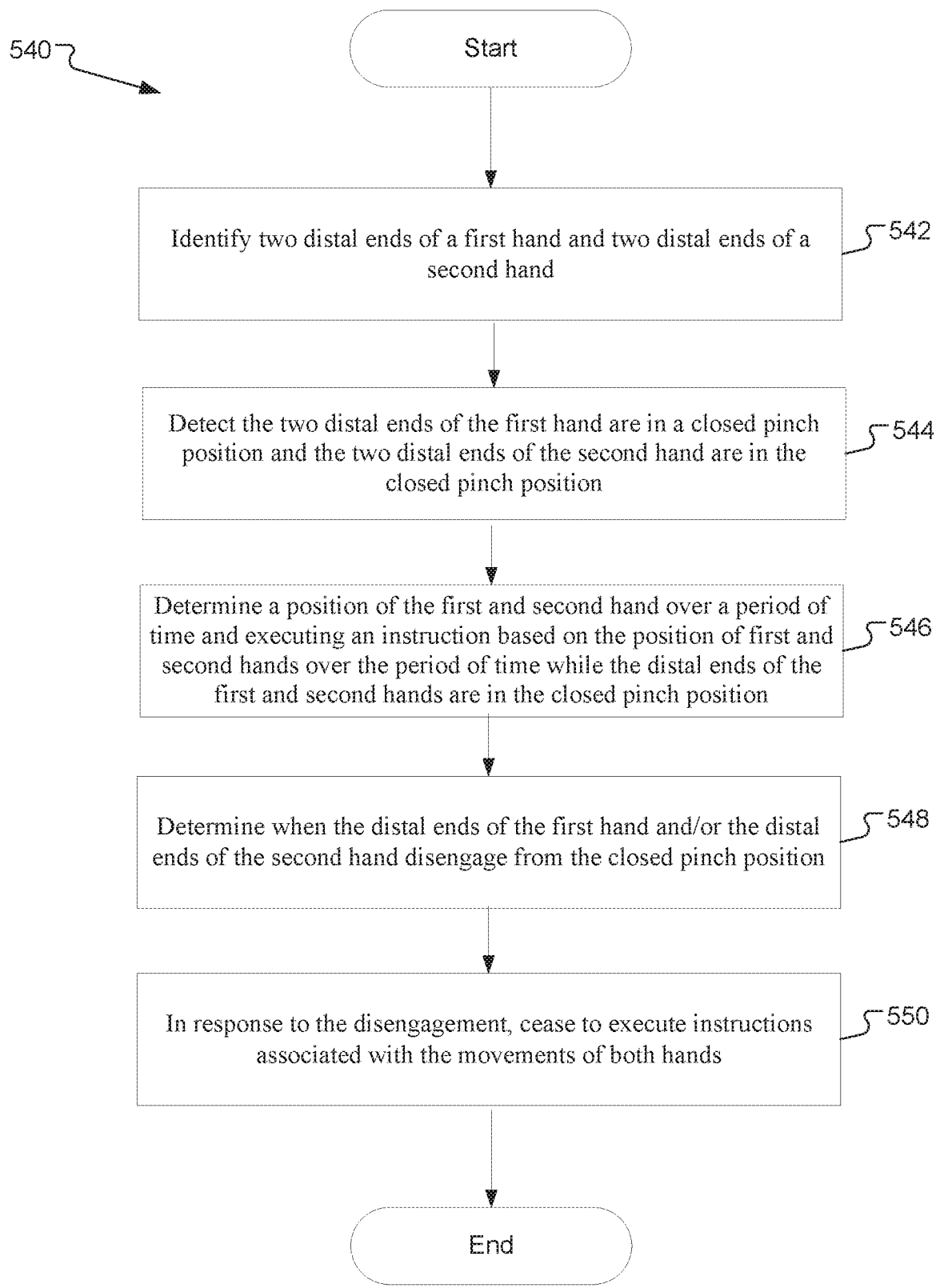
FIG. 5C illustrates a flowchart for a method of combining gestures detected by a wearable device, according to an embodiment

FIG. 5C illustrates a flowchart 540 for a method of combining gestures detected by a wearable device, according to an embodiment. The method may include identifying two distal ends of a first hand and two distal ends of a second hand (block 542). In one example, a first cursor may be displayed between the two distal ends of the first hand and a second cursor may be displayed between the two distal ends of the second hand. The method may include detecting the two distal ends of the first hand are in a closed pinch position and the two distal ends of the second hand are in the closed pinch position (block 544). In one example, when the two distal ends of the first hand are in the closed pinch position the first cursor may become a first engagement cursor to indicate a first point a UI element is engaged or selected and when the two distal ends of the second hand are in the closed pinch position the second cursor may become a second engagement cursor to indicate a second point a UI element is engaged or selected.

The method may include determining a position of the first and second hand over a period of time and executing an instruction based on the position of first and second hands over the period of time while the distal ends of the first and second hands are in the closed pinch position (block 546). In one example, the instruction may be a zoom instruction to zoom in or zoom out on the UI element. For example, as the first and second hands move closer to each other the UI element may be enlarged to zoom in and as the first and second hands move away from each other the UI element may be shrunk to zoom out, or vise versa. In another example, the amount that the UI element is enlarged or shrunken may be relative to a distance the two distal ends of the first hand and the second hand are to a midpoint or a central point between the two distal ends of the first hand and the second hand. The relative distance traveled by the two hands may determine the level of zooming (i.e. enlargement or shrinkage). In another example, as the first hand and the second hand remain at approximately the same distance from each other and are rotated clockwise or counterclockwise, the selected UI element may be rotated in the augmented display along an axis corresponding clockwise or counterclockwise movement. In another example, the rotation of the selected UI element may be a three-dimensional rotation whereas the two distal ends of the first hand and the second hand are rotated or moved within three-dimensional space the UI element may correspondingly rotate in the three-dimensional space about an axis.

The method may include determining when the distal ends of the first hand and/or the distal ends of the second hand disengage from the closed pinch position (block 548). The method may include, in response to the disengagement, ceasing to execute instructions associated with the movements of both hands (block 550).

Figure 6:
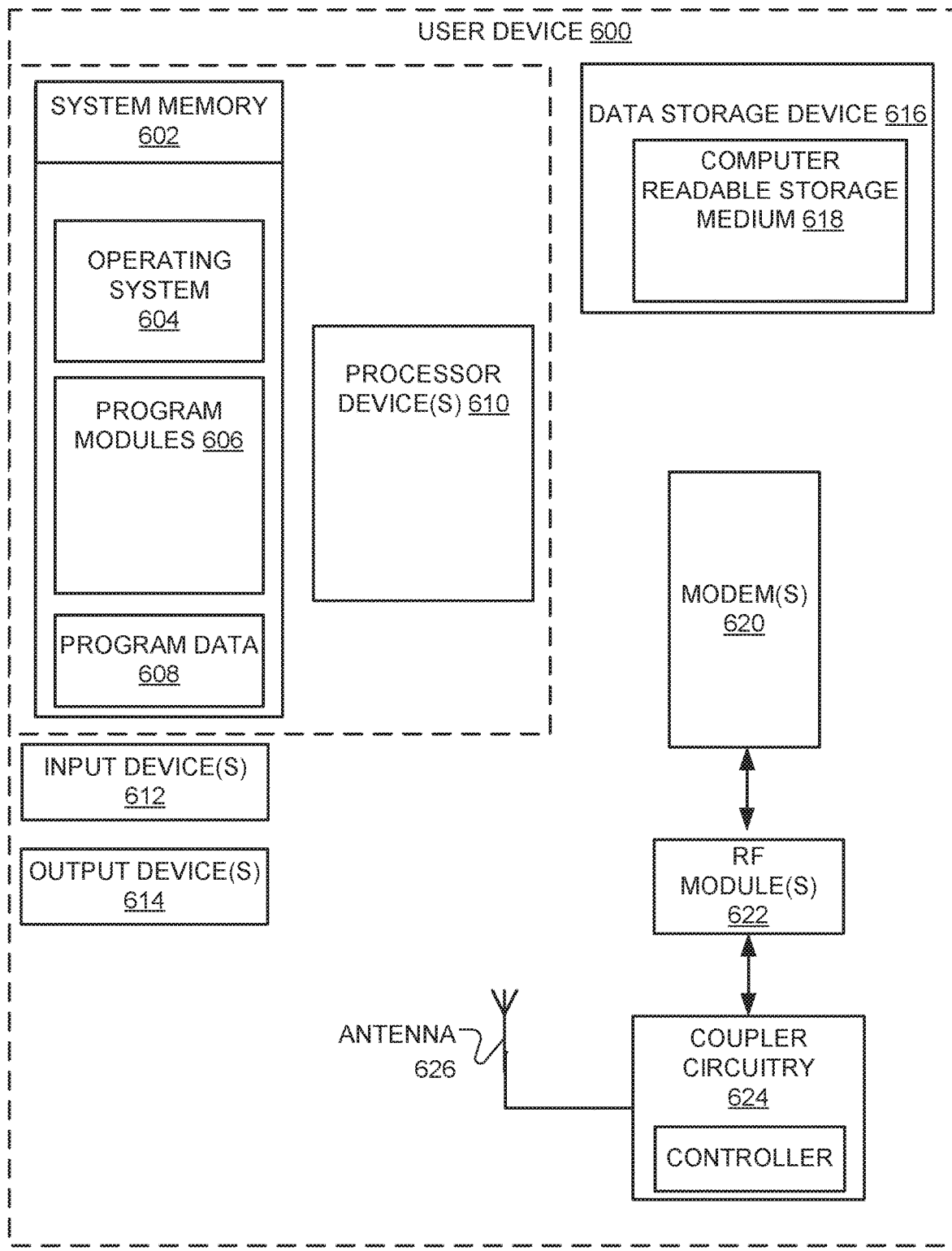
FIG. 6 is a block diagram of a user device with a processing device in which implementations of methods, systems, devices, or apparatuses in FIGS. 1-5C may be implemented.

FIG. 6 is a block diagram of a user device 600 with a processing device in which implementations of methods, systems, devices, or apparatuses in FIGS. 1-5C may be implemented. The user device 600 may display and/or implement the method and GUIs of FIGS. 1A-5C. The user device 600 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 600 may be any portable or stationary user device. For example, the user device 600 may be an intelligent voice control and speaker system. Alternatively, the user device 600 can be any other device used in a WLAN network (e.g., Wi-Fi® network), a WAN network, or the like.

The user device 600 includes one or more processing device(s) 610, such as one or more CPUs, microcontrollers, field programmable gate arrays, or other types of processing devices. The user device 600 also includes system memory 602, which may correspond to any combination of volatile and/or non-volatile storage mechanisms. The system memory 602 stores information that provides operating system 604, various program modules 606, program data 608, and/or other components. In one implementation, the system memory 602 stores instructions of the methods in FIGS. 5A-5C as described herein. The user device 600 performs functions by using the processing device(s) 610 to execute instructions provided by the system memory 602.

The user device 600 also includes a data storage device 616 that may be composed of one or more types of removable storage and/or one or more types of non-removable storage. The data storage device 616 includes a computer-readable storage medium 618 on which is stored one or more sets of instructions embodying any of the methodologies or functions described herein. Instructions for the program modules 606 may reside, completely or at least partially, within the computer-readable storage medium 618, system memory 602 and/or within the processing device(s) 610 during execution thereof by the user device 600, the system memory 602 and the processing device(s) 610 also constituting computer-readable media. The user device 600 may also include one or more input devices 612 (keyboard, mouse device, specialized selection keys, etc.) and one or more output devices 614 (displays, printers, audio output mechanisms, etc.).

The user device 600 further includes modem 620 to allow the user device 600 to communicate via a wireless network(s) (e.g., such as provided by the wireless communication system) with other computing devices, such as remote computers, an item providing system, and so forth. The modem 620 can be connected to zero or more RF modules 622. The zero or more RF modules 622 can be connected to zero or more coupler circuitry 624. The RF modules 622 and/or the coupler circuitry 624 may be a WLAN module, a WAN module, PAN module, or the like. Antenna 626 is coupled to the coupler circuitry 624, which is coupled to the modem 620 via the RF modules 622. The modem 620 allows the user device 600 to handle both voice and non-voice communications (such as communications for text messages, multimedia messages, media downloads, web browsing, etc.) with a wireless communication system. The modem 620 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi® technology, Long Term Evolution (LTE) and LTE Advanced (sometimes generally referred to as 4G), etc.

The modem 620 may generate signals and send these signals to antenna 626 via coupler circuitry 624 as described herein. User device 600 may additionally include a WLAN module, a GPS receiver, a PAN transceiver and/or other RF modules. The coupler circuitry 624 may additionally or alternatively be connected to one or more of coupler arrays. The antenna 626 may be configured to transmit in different frequency bands and/or using different wireless communication protocols. The antenna 626 may be directional, omni-directional, or non-directional antennas. In addition to sending data, the antenna 626 may also receive data, which is sent to appropriate RF modules 622 connected to the antenna 626.

In one implementation, the user device 600 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one implementation, the first wireless connection is associated with a first resonant mode of an antenna structure that operates at a first frequency band and the second wireless connection is associated with a second resonant mode of the antenna structure that operates at a second frequency band. In another implementation, the first wireless connection is associated with a first antenna element and the second wireless connection is associated with a second antenna element. In other implementations, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though modem 620 is shown to control transmission and reception via the antenna 626, the user device 600 may alternatively include multiple modems, each of which is configured to transmit/receive data via a different antenna and/or wireless transmission protocol.

The user device 600 delivers and/or receives items, upgrades, and/or other information via the network. For example, the user device 600 may download or receive items from an item providing system. The item providing system receives various requests, instructions and other data from the user device 600 via the network. The item providing system may include one or more machines (e.g., one or more server computer systems, routers, gateways, etc.) that have processing and storage capabilities to provide the above functionality. Communication between the item providing system and the user device 600 may be enabled via any communication infrastructure. One example of such an infrastructure includes a combination of a wide area network (WAN) and wireless infrastructure, which allows a user to use the user device 600 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected to the network. The WLAN hotspots can be created by products based on IEEE 802.11x standards for the Wi-Fi® technology by Wi-Fi® Alliance. Another of the wireless communication systems may be a wireless carrier system that can be implemented using various data processing equipment, communication towers, etc. Alternatively, or in addition, the wireless carrier system may rely on satellite technology to exchange information with the user device 600.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user device 600 is variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 600 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present implementations are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other implementations will be apparent to those of skill in the art upon reading and understanding the above description. The scope of the present implementations should, therefore, be determined with reference to the appended claims, along with the full scope of equivalents to which such claims are entitled.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Although the implementations may be herein described with reference to specific integrated circuits, such as in computing platforms or microprocessing devices, other implementations are applicable to other types of integrated circuits and logic devices. Similar techniques and teachings of implementations described herein may be applied to other types of circuits or semiconductor devices. For example, the disclosed implementations are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below.

Although the implementations are herein described with reference to a processing device or processing device, other implementations are applicable to other types of integrated circuits and logic devices. Similar techniques and teachings of implementations of the present invention may be applied to other types of circuits or semiconductor devices that may benefit from higher pipeline throughput and improved performance. The teachings of implementations of the present invention are applicable to any processing device or machine that performs data manipulations. However, the present invention is not limited to processing devices or machines that perform 512 bit, 256 bit, 128 bit, 64 bit, 32 bit, and/or 16 bit data operations and may be applied to any processing device and machine in which manipulation or management of data is performed. In addition, the following description provides examples, and the accompanying drawings show various examples for the purposes of illustration. However, these examples should not be construed in a limiting sense as they are merely intended to provide examples of implementations of the present invention rather than to provide an exhaustive list of all possible implementations of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or media devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

Implementations described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present implementations. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present implementations.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description below. In addition, the present implementations are not described with reference to any particular programming language. It will be appreciated that a variety of programming languages may be used to implement the teachings of the implementations as described herein.

The above description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A device, comprising:
a wearable display configured to:
    attach to a head of a user; and
    display an augmented reality environment to the user, wherein the augmented reality environment includes a virtual object;
a sensor configured to:
    detect a position of a first digit of a first hand of the user; and
    detect a position of a second digit of the first hand of the user;
    detect a position of a palm center and/or wrist point of the first hand of the user; and
a processing device coupled to the wearable display and the sensor, wherein the processing device is configured to:
    define a tap instruction associated with the virtual object;
    map a closed pinch position to the tap instruction such that detection of the closed pinch position by the sensor triggers execution of the tap instruction by the processing device;
    output, to the wearable display, data for displaying the virtual object;
    identify a first fingertip of the first digit;
    identify a second fingertip of the second digit;
    identify a wrist point of the wrist or a palm-center of the palm;
    determine that the first fingertip and the second fingertip are in an open pinch position of a pinch gesture at a first point in time;
    determine that the first fingertip and the second fingertip are in the closed pinch position of the pinch gesture at a second point in time, wherein the second point in time is after the first point in time, the determination that the first fingertip and the second fingertip are in the closed position comprises:
        compare a current position of the first fingertip and a current position of the second fingertip to a dataset of average positions for the closed pinch position of the first digit and the second digit given a palm size of the user;
        determine an average distance between the first digit and the second digit for the closed pinch position based on the dataset of average positions; and
        define a buffer value for the closed pinch position;
        designate the first fingertip and the second fingertip as being in the closed pinch position when a distance between the first digit and the second digit is less than the average distance less the buffer value;

determine that the first fingertip and the second fingertip are in the closed pinch position of the pinch gesture for a first threshold period of time;

determine, in response to detection of the pinch gesture, a virtual position of the cursor at a virtual position of the virtual object based on a position of the palm center and/or wrist point during the pinch gesture to the exclusion of the location of the first fingertip and the second fingertip; and execute the tap instruction in response to:
the first fingertip and the second fingertip being in the closed pinch position for the first threshold period of time; and
the wrist point or the palm-center being oriented towards the virtual object.

2. The device of claim 1, wherein the virtual position of the cursor is further based on a midpoint between the first fingertip and the second fingertip when a pinch gesture is not detected.

3. The device of claim 2, wherein to identify the first fingertip and the second fingertip, the processing device is further configured to:
capture, by the sensor, an image or a video of the first hand; and
determine geometric information of the first hand in the image or a frame of the video using a hand skeleton detection algorithm to identify hand skeleton key points.

4. The device of claim 3, wherein the processing device is further configured to identify the positions of the first digit, the second digit, the first fingertip, or the second fingertip based on the hand skeleton key points.

5. The device of claim 1, wherein:
the sensor is further configured to:
detect a position of a third digit of a second hand of the user; and
detect a position of a fourth digit of the second hand of the user; and
the processing device is further configured to:
identify a third fingertip of the third digit;
identify a fourth fingertip of the fourth digit;
determine that the third fingertip and the fourth fingertip are in the open pinch position at the first point in time;
determine that the third fingertip and the third fingertip are in the closed pinch position at the second point in time;
determine that the first fingertip and the second fingertip are in the closed pinch position; and
in response to that the first fingertip, the second fingertip, the third fingertip, and the fourth fingertip being in the closed pinch position, execute a different instruction.

6. The device of claim 5, wherein the different instruction is a zoom instruction to enlarge or shrink a size of the virtual object.

7. The device of claim 6, wherein the processing device is configured to:
determine that the first fingertip and the second fingertip are moving away from the third fingertip and the fourth fingertip; and
execute the zoom instruction to enlarge the virtual object.

8. The device of claim 6, wherein the processing device is configured to:
determine that the first fingertip and the second fingertip are moving towards the third fingertip and the fourth fingertip; and
execute the zoom instruction to shrink the virtual object.

9. The device of claim 5, wherein:
the different instruction is a rotate instruction; and
the processing device is configured to:
determine that the first fingertip, the second fingertip, the third fingertip, and the fourth fingertip rotate about an axis; and
rotate the virtual object about the axis relative to rotation of the first fingertip, the second fingertip, the third fingertip, and the fourth fingertip rotate about the axis.

10. The device of claim 1, wherein the wearable display, the sensor, and the processing device are integrated into smart glasses.

11. The device of claim 1, wherein the processing device is further configured to:
determine that the first fingertip and the second fingertip are in the closed pinch position for a second threshold period of time; and
in response to that the first fingertip and the second fingertip are in the closed pinch position for the second threshold period of time, execute a swipe instruction associated with the closed pinch position.

12. A method, comprising:
detecting, by a sensor, a position of a first digit of a hand of a user;
detecting, by the sensor, a position of a second digit of the hand of the user;
detecting, by the sensor, a position of a wrist or a palm of the hand of the user;
identifying, by a processing device, a first fingertip of the first digit;
identifying, by the processing device, a second fingertip of the second digit;
identifying a wrist point of the wrist or a palm-center of the palm;
outputting, to a display device, data for displaying a virtual object;
in response to determining the orientation of the wrist point or the palm-center is towards the virtual object, outputting, to the display device, data for displaying the cursor at a virtual position of the virtual object;
determining, by the processing device, that the first fingertip and the second fingertip are in an open pinch position of a pinch gesture at a first point in time;
determining, by the processing device, that the first fingertip and the second fingertip are in a closed pinch position of a pinch gesture at a second point in time, wherein the second point in time is after the first point in time, the wherein determining that the first fingertip and the second fingertip are in the closed position comprises:
comparing a current position of the first fingertip and a current position of the second fingertip to a dataset of average positions for the closed pinch position of the first digit and the second digit given a palm size of the user;
determining an average distance between the first digit and the second digit for the closed pinch position based on the dataset of average positions; and defining a buffer value for the closed pinch position;
designating the first fingertip and the second fingertip as being in the closed pinch position when a distance between the first digit and the second digit is less than the average distance less the buffer value;
determining, by the processing device, that the first fingertip and the second fingertip are in the closed pinch position for a threshold period of time;
determining, in response to detection of the pinch gesture, a virtual position of the cursor at the virtual position of the virtual object based on a position of a palm center and/or wrist point during the pinch gesture, wherein the virtual position of the cursor ignores the position of the first fingertip of the first digit and the second fingertip of the second digit during the pinch gesture; and
executing, at an end of the threshold period of time, a tap instruction associated with the closed pinch position.

13. The method of claim 12, wherein the location of the cursor is further based on a midpoint between the first fingertip and the second fingertip at the first point in time.

14. The method of claim 12, wherein identifying the first fingertip, the second fingertip, the wrist point, or the palm-center comprises:
capturing, by the sensor, an image or a video of the hand; and
determining, by the processing device, geometric information of the hand in the image or a frame of the video using a hand skeleton detection algorithm to identify hand skeleton key points.

15. The method of claim 14, further comprising identifying, by the processing device, the positions of the first digit, the second digit, the first fingertip, the second fingertip, the wrist, the palm, the wrist point, or the palm-center based on the hand skeleton key points.

16. A device, comprising:
a wearable display configured to:
attach to a head of a user; and
display an augmented reality environment to the user, wherein the augmented reality environment includes a virtual object;
a sensor configured to:
detect a position of a first digit of a hand of the user; and
detect a position of a second digit of the hand of the user;
detect a position of a palm center and/or wrist point of the hand of the user; and
a processing device coupled to the wearable display and the sensor, wherein the processing device is configured to:
define a tap instruction that is associated with the virtual object;
map a closed pinch position to the tap instruction such that detection of the closed pinch position by the sensor triggers execution of the tap instruction by the processing device;
output, to the wearable display, data for displaying the virtual object;
identify a first fingertip of the first digit;
identify a second fingertip of the second digit;
determine that the first fingertip and the second fingertip are in a closed pinch position of a pinch gesture for a first threshold period of time, the determination that the first fingertip and the second fingertip are in the closed position comprises:
compare a current position of the first fingertip and a current position of the second fingertip to a dataset of average positions for the closed pinch position of the first digit and the second digit given a palm size of the user;
determine an average distance between the first digit and the second digit for the closed pinch position based on the dataset of average positions; and
define a buffer value for the closed pinch position;
designate the first fingertip and the second fingertip as being in the closed pinch position when a distance between the first digit and the second digit is less than the average distance less the buffer value;
output, in response to a detection of the pinch gesture, a virtual position of the cursor based on the position of the palm center and/or the wrist point of the hand of the user during the pinch gesture to exclusion of the position of the first fingertip of the first digit and the second fingertip of the second digit during the pinch gesture; and
execute the tap instruction at an end of the first threshold period of time.

17. The device of claim 16, wherein the average distance between the first digit and the second digit for the closed pinch position based on the dataset of average positions is a distance range.

18. The device of claim 16, wherein the location of the cursor is at a virtual position of the virtual object.

19. The device of claim 16, wherein the tap instruction is associated with a single tap on a touch sensor or a double tap on the touch sensor.

20. The device of claim 16, wherein the processing device is configured to:
determine that the first fingertip and the second fingertip are in a closed pinch position for a second threshold period of time that is different from the first threshold period of time; and
execute, at the end of the second threshold period of time, a different instruction associated with the closed pinch position, wherein the different instruction is different than the tap instruction.

* * * * *